US010323389B2

(12) United States Patent
Rees et al.

(10) Patent No.: US 10,323,389 B2
(45) Date of Patent: Jun. 18, 2019

(54) CONTROL SYSTEM AND METHOD FOR A MACHINE

(71) Applicant: Caterpillar Inc., Peoria, IL (US)

(72) Inventors: Lindsay Rees, Peterborough (GB); Tobias Lippa, Wackersdorf (DE); Thomas Spindler, Wackersdorf (DE)

(73) Assignee: Caterpillar Inc., Deerfield, IL (US)

(*) Notice: Subject to any disclaimer, the term of this patent is extended or adjusted under 35 U.S.C. 154(b) by 274 days.

(21) Appl. No.: 15/469,854

(22) Filed: Mar. 27, 2017

(65) Prior Publication Data

US 2017/0292249 A1 Oct. 12, 2017

(30) Foreign Application Priority Data

Apr. 8, 2016 (GB) .................................. 1606187.1

(51) Int. Cl.

| | |
|---|---|
| ***G06F 7/70*** | (2006.01) |
| ***G06F 19/00*** | (2018.01) |
| ***G06G 7/00*** | (2006.01) |
| ***G06G 7/76*** | (2006.01) |
| ***E02F 9/26*** | (2006.01) |
| ***E02F 3/43*** | (2006.01) |
| ***B66C 23/88*** | (2006.01) |
| ***B66F 17/00*** | (2006.01) |
| ***E02D 17/13*** | (2006.01) |
| ***E02F 9/12*** | (2006.01) |
| ***E02F 9/22*** | (2006.01) |
| *E02F 9/20* | (2006.01) |

(52) U.S. Cl.
CPC .............. *E02F 9/265* (2013.01); *B66C 23/88* (2013.01); *B66F 17/003* (2013.01); *E02D 17/13* (2013.01); *E02F 3/437* (2013.01); *E02F 9/121* (2013.01); *E02F 9/2253* (2013.01); *E02F 9/20* (2013.01)

(58) Field of Classification Search
CPC ....... B66C 23/88; B66F 17/003; E02D 17/13; E02F 3/437; E02F 9/121; E02F 9/20; E02F 9/2253; E02F 9/265
See application file for complete search history.

(56) References Cited

U.S. PATENT DOCUMENTS

| | | | | |
|---|---|---|---|---|
| 3,749,269 | A | 7/1973 | Conrad | |
| 4,582,141 | A | 4/1986 | van der Lely | |
| 6,609,368 | B2 | 8/2003 | Dvorak et al. | |
| 8,019,514 | B2 * | 9/2011 | Yuet | B60T 7/12 701/50 |
| 2005/0192732 | A1 * | 9/2005 | Narisawa | B66C 23/905 701/50 |
| 2010/0299032 | A1 | 11/2010 | Roth | |
| 2012/0209502 | A1 * | 8/2012 | Nichols | B62D 53/021 701/124 |

(Continued)

FOREIGN PATENT DOCUMENTS

| | | |
|---|---|---|
| CN | 102556143 B | 8/2014 |
| DE | 4301745 | 6/1994 |

(Continued)

*Primary Examiner* — Harry Y Oh

(57) ABSTRACT

A control system for a work machine having an upper frame rotatably mounted to a lower frame includes a controller configured to limit a maximum speed of the machine when a rotation angle between the upper frame and the lower frame exceeds a first predetermined value.

11 Claims, 9 Drawing Sheets

(56) References Cited

U.S. PATENT DOCUMENTS

2014/0330490 A1* 11/2014 Aoki ..................... E02F 9/2079
701/50
2015/0090507 A1* 4/2015 Okada ................. B66F 9/07568
180/65.51
2015/0127229 A1* 5/2015 Goraya ................. B60W 30/04
701/50
2016/0017573 A1 1/2016 Colwell et al.
2016/0052440 A1* 2/2016 Young ....................... B60P 1/34
298/1 C
2016/0281335 A1* 9/2016 Benzal .................... E02F 9/267

FOREIGN PATENT DOCUMENTS

EP 0423372 A1 4/1991
EP 2949820 12/2015
JP 2001262628 9/2001
WO 2014186200 11/2014

* cited by examiner

CONTROL SYSTEM AND METHOD FOR A MACHINE

TECHNICAL FIELD

The present disclosure relates to a control system for a machine. More particularly, the present disclosure relates to a control system and method for regulating a machine's speed according to the position of an upper frame relative to a lower frame of the machine.

BACKGROUND

Work machines such as wheeled excavators include a lower frame and an upper frame that is rotatably mounted to the lower frame. The upper frame is capable of rotational movement relative to the lower frame while the lower frame is steerable in relation to a ground surface using wheels manipulated by a steering mechanism of the machine. A work implement is typically mounted to the upper frame via an arm assembly. Arm assemblies are usually articulated with respect to the upper frame for positioning the work implement. Typically, in such machines the upper frame is configured to rotate 360 degrees with respect to the lower frame. A cabin or seat for an operator is provided on the upper frame so the operator maintains visibility of the work implement as the upper frame rotates.

Some work machines, particularly wheeled machines, are capable of speeds in excess of 30 kph. The combination of speed and rotatability of the upper frame may give rise to difficulties in operator control of the machine. In particular, for example, when the upper frame is rotated such that an operator may be facing towards the rear of the lower frame, the operator controls may have a different resulting effect compared with the same controls used when the upper frame is aligned in the same facing direction as the lower frame. This may be counter intuitive for an operator and cause confusion in the controls, hence requiring an additional burden on the operator awareness and skill for operating the machine.

SUMMARY OF THE DISCLOSURE

In an aspect of the present disclosure, a control system for a work machine having an upper frame rotatably mounted to a lower frame includes a controller configured to limit a maximum speed of the machine when a rotation angle between the upper frame and the lower frame exceeds a first predetermined value.

In another aspect of the present disclosure, a work machine is provided. The work machine includes an upper frame rotatably mounted to a lower frame. The work machine further includes a controller operable to limit a maximum speed of the machine when a rotation angle between the upper frame and the lower frame exceeds a first predetermined value.

In yet another aspect of the present disclosure, a method for controlling a work machine is provided. The work machine has an upper frame rotatably mounted to a lower frame. The method includes limiting a maximum speed of the machine when a rotation angle between the upper frame and the lower frame exceeds a first predetermined value. Embodiments disclosed herein are also directed to a non-transient computer readable medium containing program instructions for causing a computer to perform the method of the present disclosure.

Other features and aspects of this disclosure will be apparent from the following description and the accompanying drawings.

DETAILED DESCRIPTION

Figure 1:
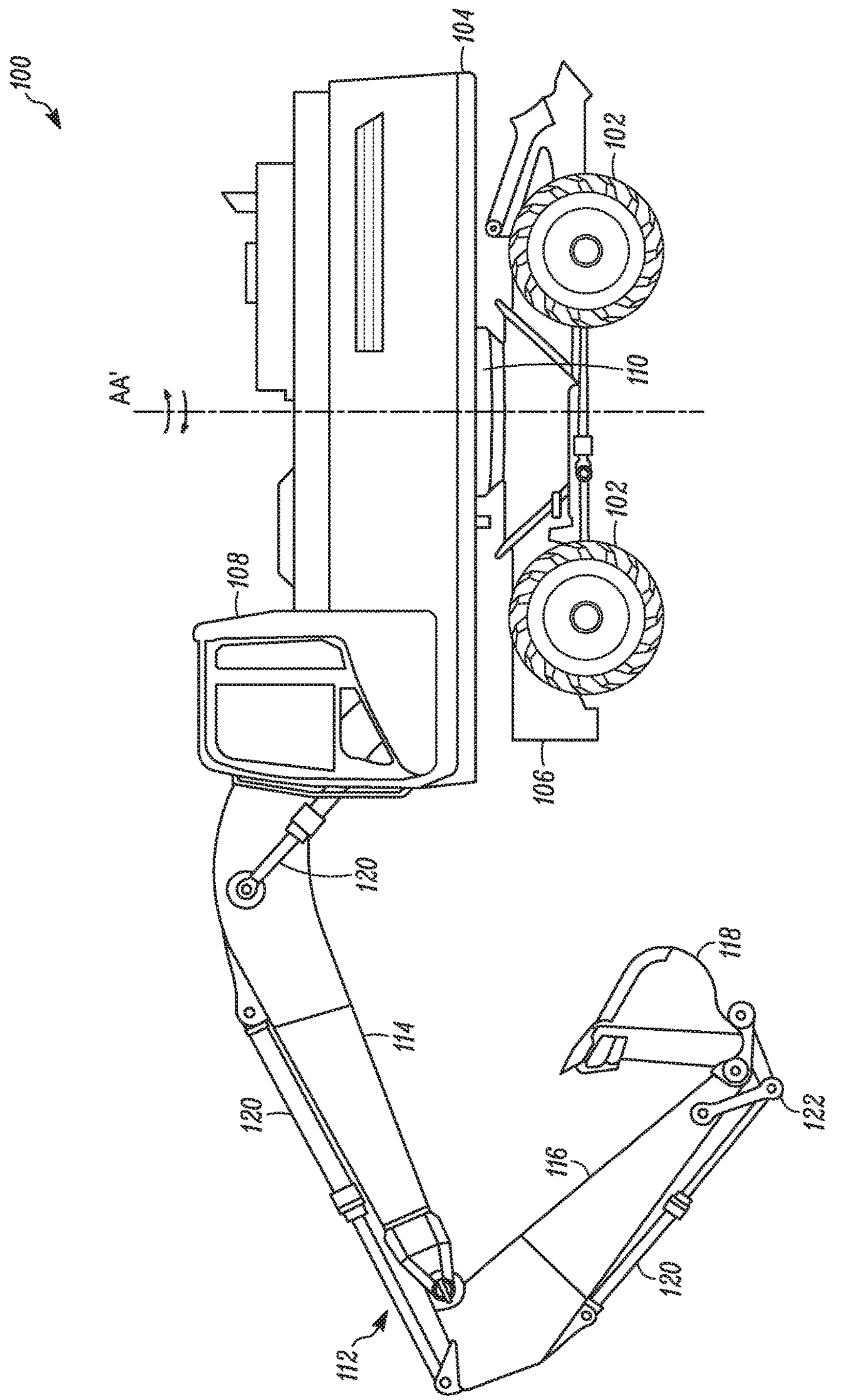
FIG. 1 is a side view of an exemplary work machine, according to an embodiment of the present disclosure.

Wherever possible, the same reference numbers will be used throughout the drawings to refer to the same or the like parts. FIG. 1 illustrates an exemplary work machine 100 (herein after referred to as "machine 100"). The machine 100 may be moved over a ground surface using wheels 102 provided on a lower frame 106 of the machine 100. The machine 100 also includes an upper frame 104 on which an operator cab 108 and an engine (not shown) are supported. The upper frame 104 is coupled to the lower frame 106 via a swivel base 110 so that the upper frame 104 may be rotated, in use, with respect to the lower frame 106 about an axis AA'.

The machine 100 shown in FIG. 1 is an excavator. Alternatively, the machine 100 may include other swivel machines, whether tracked or wheeled, in which an upper frame of the machine is capable of rotational motion with respect to a lower frame of the machine.

The machine 100 also includes an arm assembly 112 provided on the upper frame 104. The arm assembly 112 includes a boom 114, a stick 116 and an implement 118. As shown, the boom 114 is pivotally connected at one end to the upper frame 104 of the machine 100 and is pivotally connected at another end thereof to the stick 116. The implement 118 is connected to the stick 116 via a coupling mechanism 122. The arm assembly 112 is actuated by a pair of hydraulic cylinders 120. The arrangement of the arm assembly 112 described herein is exemplary in nature and does not limit the scope of the present disclosure.

Referring to FIG. 1, the implement 118 is work tool in the form of a bucket. Other forms of implement 118 may also be used according to the task to be performed. For example, the implement 118 may be a grappler, a hammer, a fork, a lifting hook, a saw, a rotary broom, a shear, or any other appropriate work tool known in the art.

The operator cab 108 includes a number of input devices (not shown) including, but not limited to, a control panel, joysticks, and levers for the operator to control one or more operations of the machine 100 and the implement 118. During operation, the engine may drive a hydraulic pump (not shown) to supply high pressure hydraulic fluid to a hydraulic system. The hydraulic system may be used to actuate the hydraulic cylinders 120 provided in association with the boom 114, the stick 116, and the implement 118.

Figure 2:
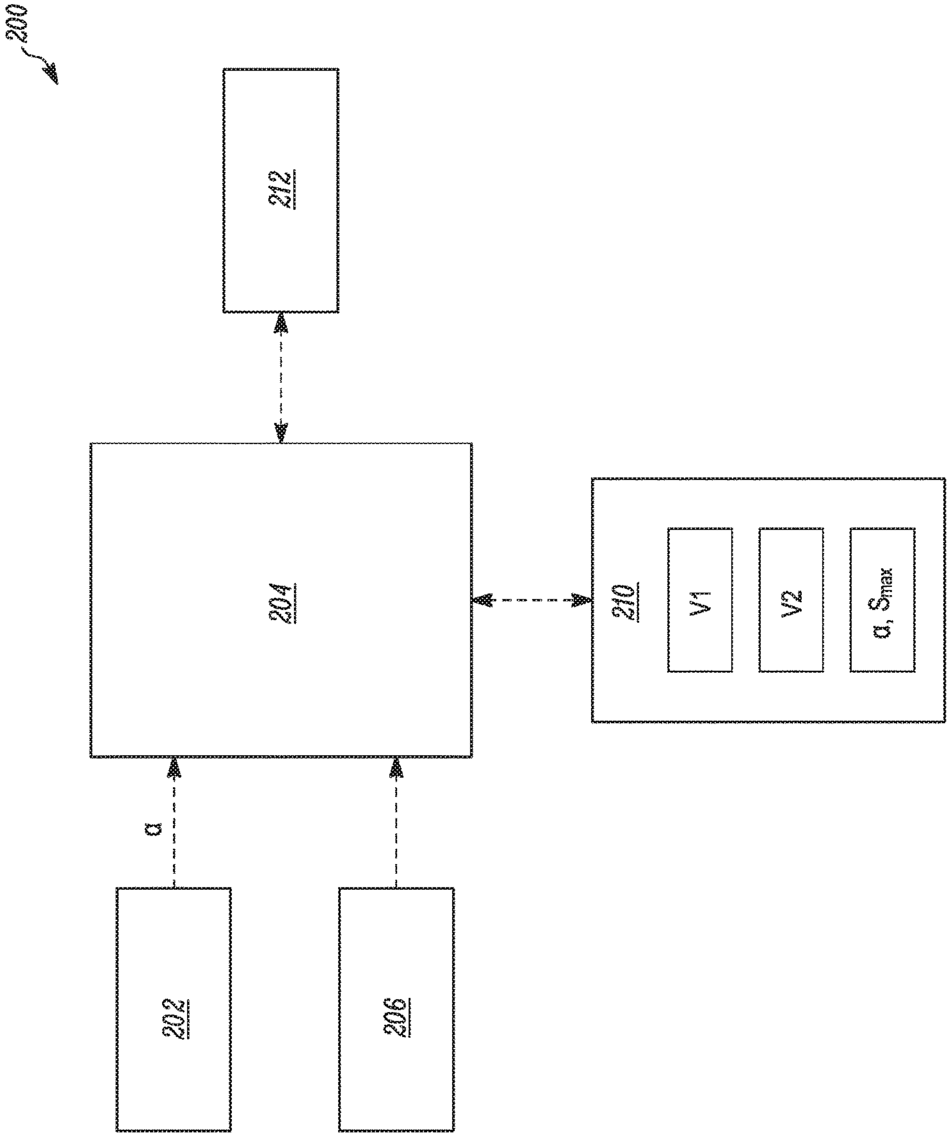
FIG. 2 is a block diagram of a control system that can be implemented for controlling a movement of the work machine, according to an embodiment of the present disclosure.

The present disclosure relates to a control system 200 (shown in FIG. 2) associated with the machine 100. Referring to FIG. 2, the control system 200 includes a sensor 202 that is associated with the upper and lower frames 104, 106 of the machine 100. The sensor 202 is configured to detect a rotation angle $\alpha$ between the upper frame 104 and the lower frame 106 of the machine 100, and generate a signal indicative of the rotation angle $\alpha$ of the upper frame 104 relative to the lower frame 106.

The control system 200 also includes a controller 204 communicably coupled to the sensor 202. The controller 204 is configured to generate appropriate signals to control a speed of travel for the machine 100 based the signal from the sensor 202 as will be described in more detail below.

The controller 204 is communicably coupled to a swing control device 206 e.g., a joystick that could be conveniently located within the operator cab 108 for use by an operator of the machine 100. The controller 204 is configured to receive user commands from the swing control device 206 for swiveling the upper frame 104 relative to the lower frame 106. A direction of swivel motion associated with the upper frame 104 i.e., in a clockwise or counter-clockwise direction about the axis AA' and a speed of swivel movement to be executed by the upper frame 104 may be defined by the type of user input provided at the swing control device 206.

The controller 204 is also in communication with a memory 210. The memory 210 may include any known data storage and retrieval device. The controller 204 may be an electronic controller that operates in a logical fashion to perform operations, execute control algorithms, store and retrieve data and other desired operations. The controller 204 may include or access memory, secondary storage devices, processors, and any other components for running an application. The memory and secondary storage devices may be in the form of read-only memory (ROM) or random access memory (RAM) or integrated circuitry that is accessible by the controller 204. Various other circuits may be associated with the controller 204 such as power supply circuitry, signal conditioning circuitry, driver circuitry, and other types of circuitry.

The controller 204 may be a single controller or may include more than one controller disposed to control various functions and/or features of the machine 100. The term "controller" is meant to be used in its broadest sense to include one or more programmable logic controllers, embedded controllers, microcontrollers and/or microprocessors that may be associated with the machine 100 and that may cooperate in controlling various functions and operations of the machine 100 disclosed herein.

The memory 210 may be configured to store a first predetermined value V1 associated with the rotation angle $\alpha$ of the upper frame 104 relative to the lower frame 106. In embodiments of this disclosure, the controller 204 is configured to generate appropriate signals to limit a maximum speed, $S_{max}$, of the machine 100 when an angular position of the upper frame 104 and the lower frame 106 as detected by the sensor 202 exceeds the first predetermined value V1. The controller 204 may compare the detected rotation angle $\alpha$ received from the sensor 202 with the first predetermined value V1. If the detected rotation angle $\alpha$ exceeds the first predetermined value V1, the controller 204 generates appropriate signals to limit the maximum speed $S_{max}$ of the machine 100. In embodiments of this disclosure, the controller may generate appropriate signals to limit the maximum speed $S_{max}$ of the machine to less than 10 kilometers per hour (km/h). However, it may be noted that 10 km/h disclosed herein is non-limiting of this disclosure, the maximum speed $S_{max}$ of the machine 100 may be limited to any suitable value depending on specific requirements of an application. For example, the maximum speed $S_{max}$ of the machine 100 may be limited to 15 km/h in lieu of the 10 km/h limit disclosed herein.

Figure 3:
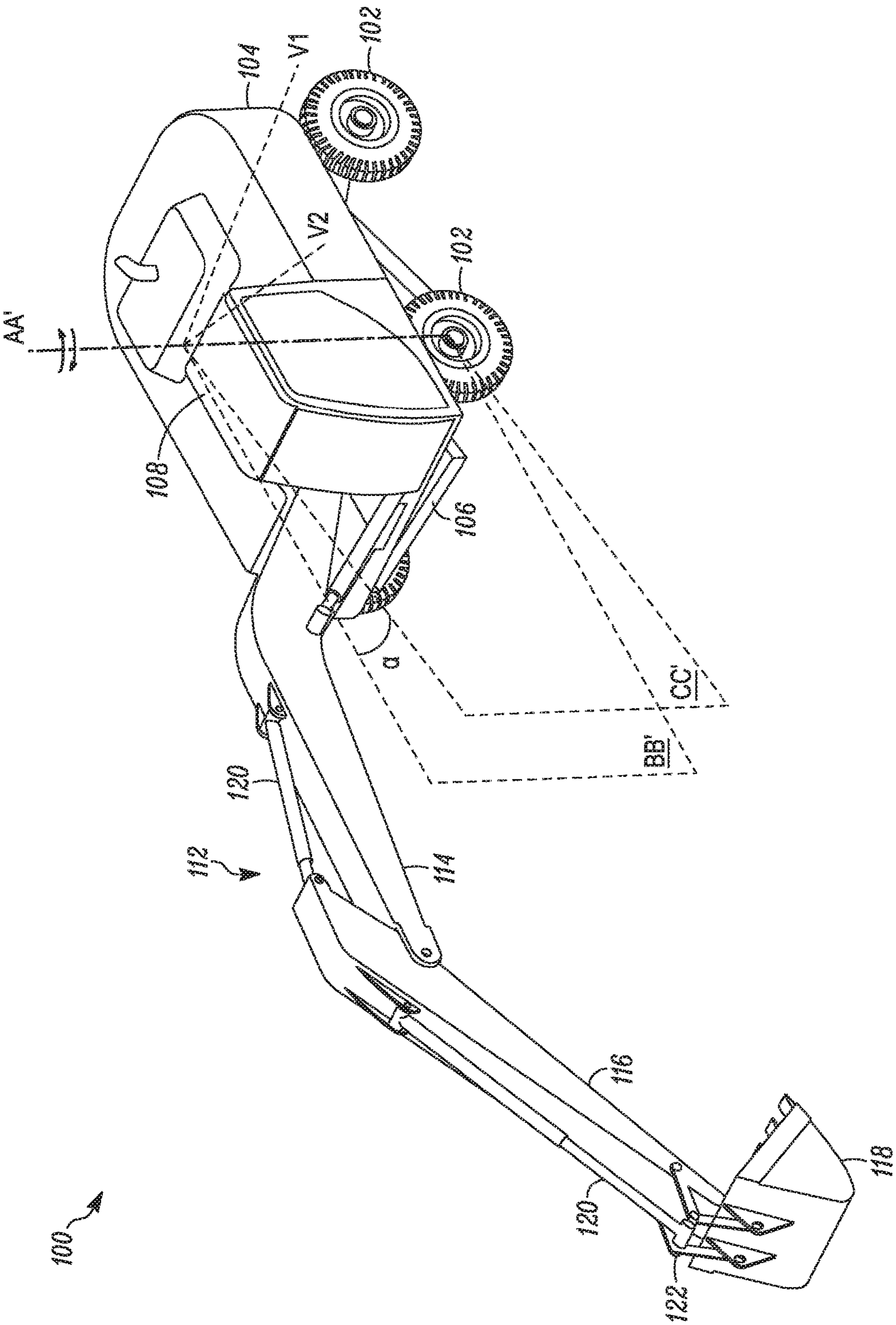
FIG. 3 is a top perspective view of the exemplary work machine of FIG. 1, according to an embodiment of the present disclosure.

The sensor 202 may measure the rotation angle $\alpha$ of the upper frame 104 with reference to a datum associated with the lower frame 106. By way of example, it can be contemplated that the datum may be disposed in line with a longitudinal plane BB' of the fixed lower frame 106 of the machine 100 as shown in FIG. 3. More particularly, the sensor 202 may measure a difference in position of a reference plane of the upper frame 104, for example, a longitudinal plane CC' of the upper frame 104 with the datum e.g., the longitudinal plane BB' of the lower frame 106.

Figure 4:
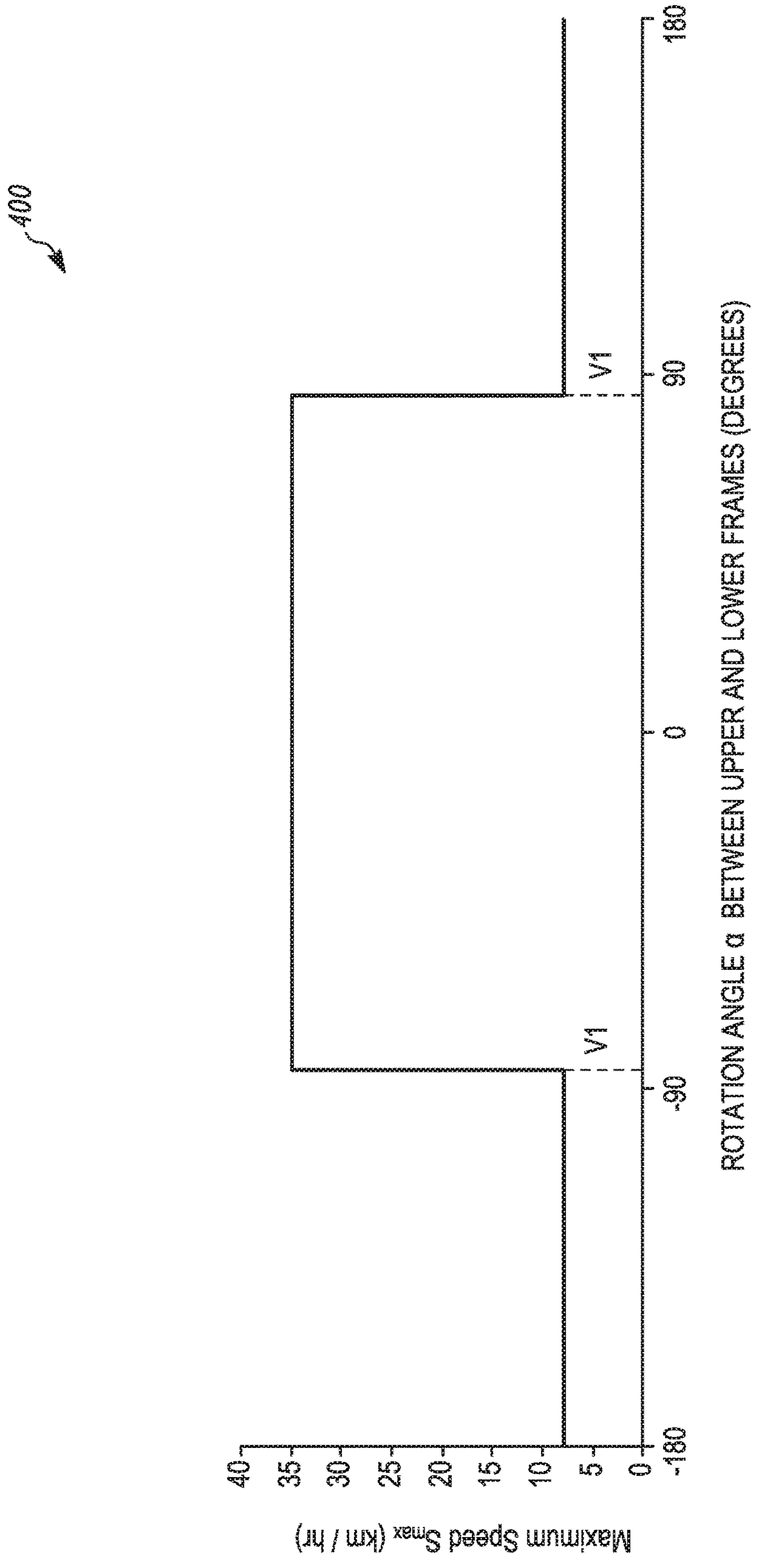
FIG. 4 is a first graph depicting changes to an exemplary maximum speed of the work machine, in accordance with an embodiment of this disclosure.

In an example configuration shown in FIG. 4, the first predetermined value V1 may be set to 85 degrees, the first predetermined value V1 also being taken in reference to the datum i.e., the longitudinal plane BB' of the lower frame 106. Upon receiving the rotation angle $\alpha$ of the upper frame 104 from the sensor 202, the controller 204 may compare the detected rotation angle $\alpha$ with the first predetermined value V1 e.g., 85 degrees as shown in FIG. 4. If the detected rotation angle $\alpha$ exceeds the first predetermined value V1 of 85 degrees, the controller 204 generates appropriate signals to limit the maximum speed $S_{max}$ of the machine 100, for example, from 35 kilometers per hour (km/h) to 8 km/h as shown in the graph 400 of FIG. 4. The terms "maximum speed" disclosed herein could be regarded as the maximum wheel speed of the machine 100, or could alternatively be taken as the maximum ground speed of the machine 100 assuming that there would be no loss of traction at the wheels 102. Numerous methods are well known in the art for also correlating an engine speed at a given transmission ratio to obtain a given maximum wheel speed or maximum ground speed of the machine 100. Such methods may be implemented for facilitating the controller 204 in generating signals to control the engine speed such that a desired maximum speed $S_{max}$ of the machine 100 i.e., desired maximum wheel speed or desired maximum ground speed of the machine 100 can be achieved.

Figure 5:
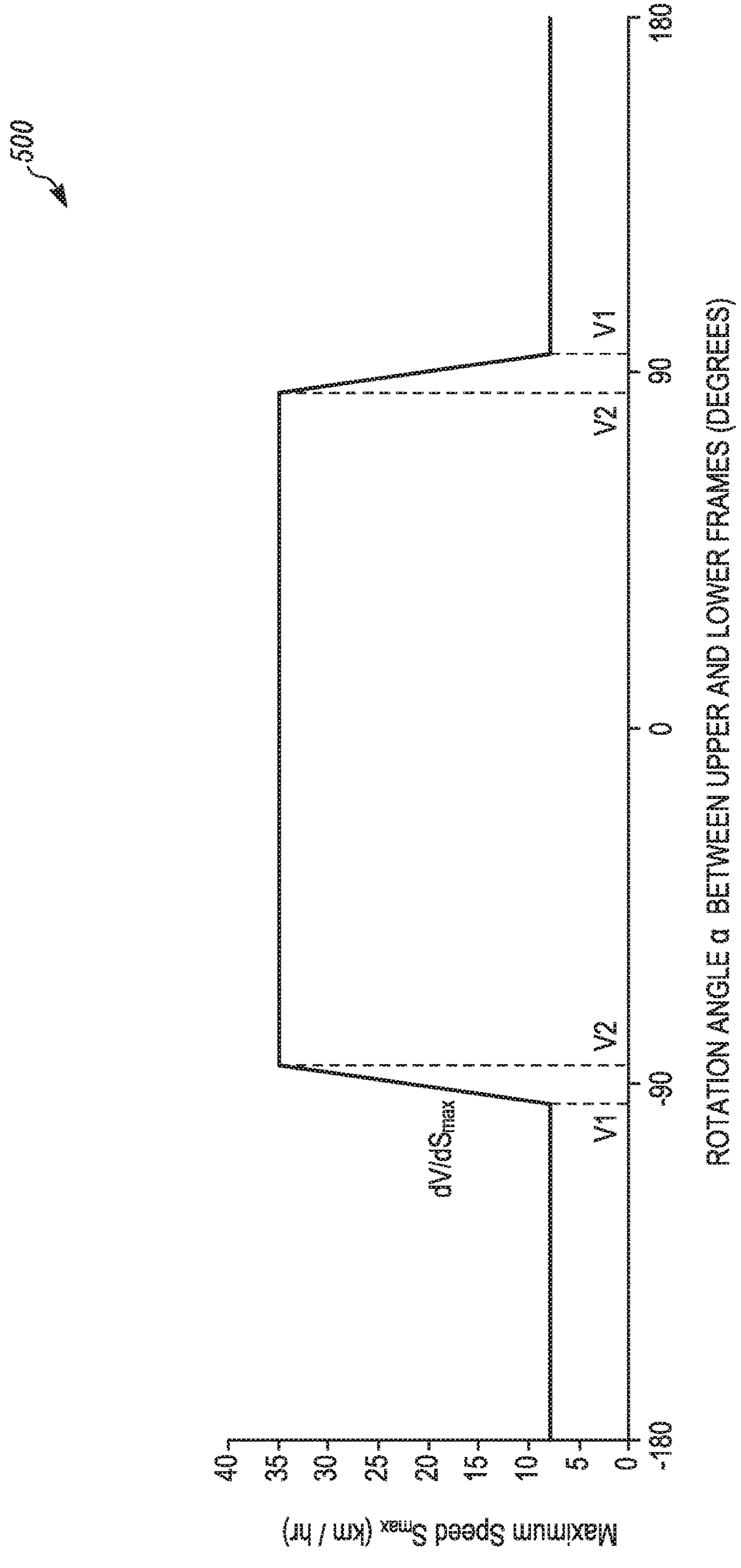
FIG. 5 is a second graph depicting changes to an exemplary maximum speed of the work machine, in accordance with another embodiment of this disclosure.

In an additional embodiment, the memory 210 associated with the controller 204 may be provided with a second predetermined value V2, the second predetermined value V2 also being taken in reference to the datum e.g., with respect to the longitudinal plane BB' of the lower frame 106. Upon receiving the rotation angle $\alpha$ of the upper frame 104 from the sensor 202, the controller 204 may determine if the detected rotation angle $\alpha$ lies between the second predetermined value V2 e.g., 85 degrees and the first predetermined value V1 e.g., 95 degrees as shown in FIG. 5. If so, the controller 204 is configured to generate appropriate signals to gradually reduce the maximum speed $S_{max}$ of the machine 100 according the rotation angle $\alpha$. In FIG. 5, this is shown as a gradual reduction in maximum speed from 35 km/h to 8 km/h as indicated by a slope $dV/dS_{max}$.

In embodiments of this disclosure, the first and second predetermined values V1, V2 may beneficially lie within a range of 70-110 degrees with respect to the datum e.g., the longitudinal plane BB' of the lower frame 106 shown in the illustrated embodiment of FIG. 3. For example, as shown in FIG. 5, the second predetermined value V2 for the longitudinal plane CC' of the upper frame 104 with respect to the longitudinal plane BB' of the lower frame 106 is set at 85 degrees while the first predetermined value V1 for the longitudinal plane CC' of the upper frame 104 with respect to the longitudinal plane BB' of the lower frame 106 is set at 95 degrees.

Figure 6:
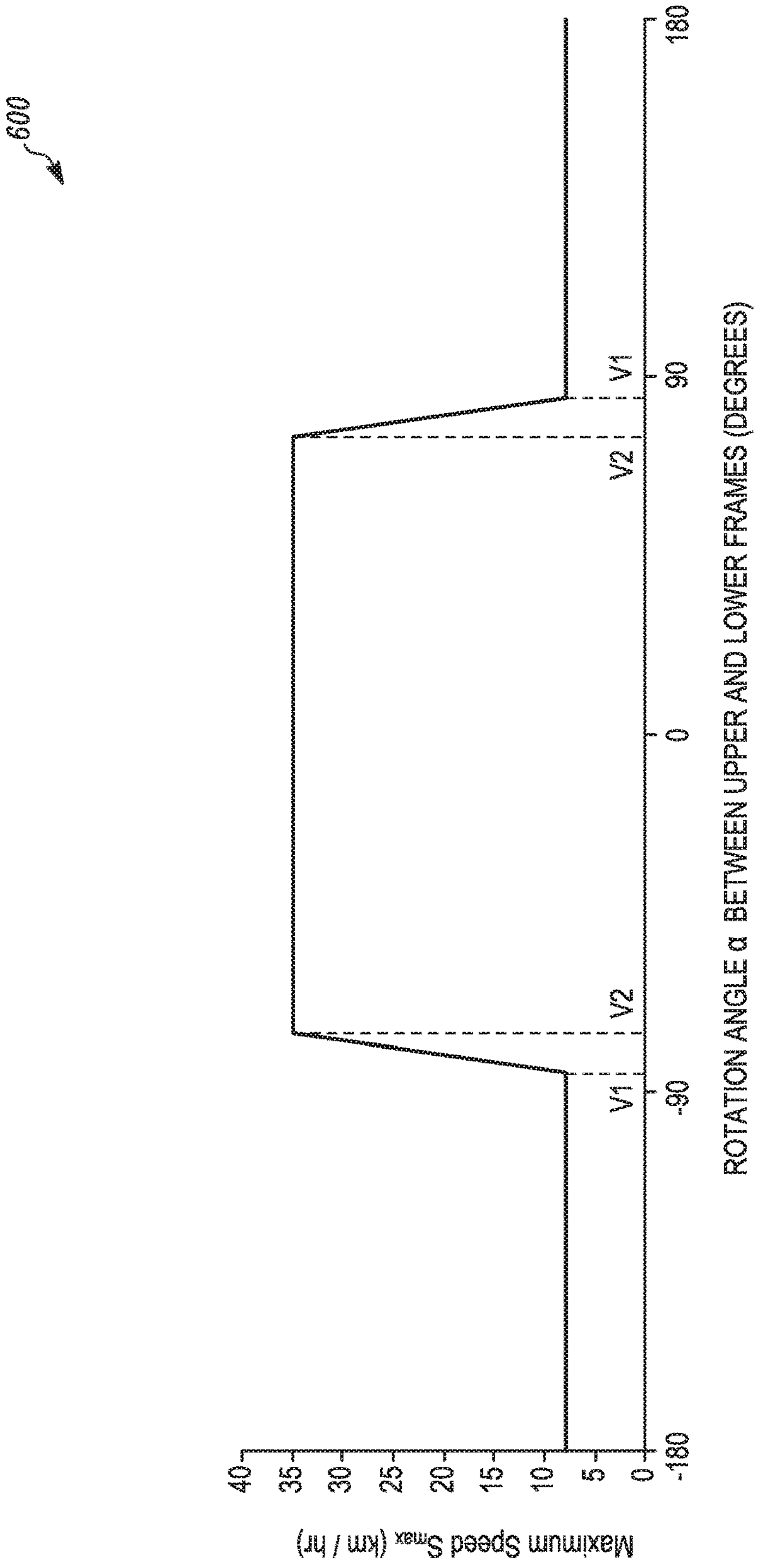
FIG. 6 is a third graph depicting changes to an exemplary maximum speed of the work machine, in accordance with yet another embodiment of this disclosure.

In another example configuration as shown by way of a graph 600 in FIG. 6, the second predetermined value V2 for the longitudinal plane CC' of the upper frame 104 with respect to the longitudinal plane BB' of the lower frame 106 is set at 75 degrees while the first predetermined value V1 for the longitudinal plane CC' of the upper frame 104 with respect to the longitudinal plane BB' of the lower frame 106 is set at 85 degrees.

Figure 7:
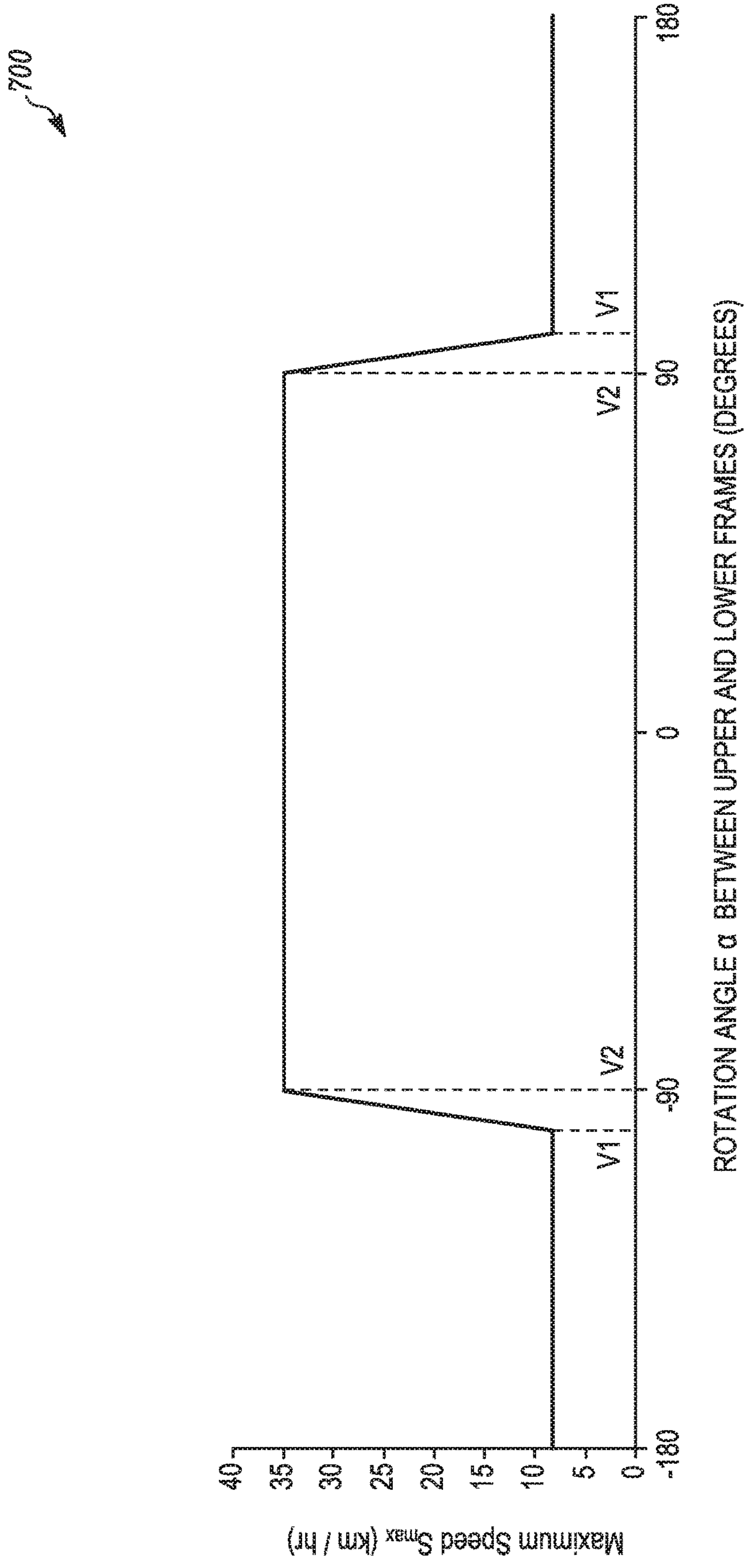
FIG. 7 is a fourth graph depicting changes to an exemplary maximum speed of the work machine, in accordance with an alternative embodiment of this disclosure.

In yet another example as shown by way of a graph 700 in FIG. 7, the second predetermined value V2 for the longitudinal plane CC' of the upper frame 104 with respect to the longitudinal plane BB' of the lower frame 106 is set at 90 degrees while the first predetermined value V1 for the longitudinal plane CC' of the upper frame 104 with respect to the longitudinal plane BB' of the lower frame 106 is set at 100 degrees.

It is to be noted that the positive and negative values of the rotation angle $\alpha$ and each of the first and second predetermined values V1, V2 indicated in FIGS. 4 to 7 are indicative of a clockwise rotation and a counter-clockwise rotation of the upper frame 104 about the axis AA' (shown in FIG. 1) e.g., in reference to the longitudinal plane BB' of the lower frame 106 as shown in FIG. 3 in which movement of the upper frame 104 and its longitudinal plane CC' leftward of the longitudinal plane BB' associated with the lower frame 106 may be considered to represent a counter-clockwise rotation of the upper frame 104 while movement of the upper frame 104 and its longitudinal plane CC' rightward of the longitudinal plane BB' associated with the lower frame 106 may represent a clockwise rotation of the upper frame 104.

Although it is disclosed herein that the first and second predetermined values V1, V2 may lie between 70-110 degrees as shown in FIGS. 3-7, the first and second predetermined values V1, V2 are non-limiting of this disclosure. It will be appreciated that the first and second predetermined values V1, V2 can be varied to advantageously suit specific requirements of an application including, but not limited to, a type of machine used, one or more operating conditions typically associated with the machine, and the like.

In an example, the second predetermined value V2 may be set at 55 degrees while the first predetermined value V1 may be set at 65 degrees so that when the longitudinal plane CC' of the upper frame 104 exceeds the second predetermined value V2 of 55 degrees with respect to the longitudinal plane BB' of the lower frame 106, the controller 204 commands a gradual reduction in the maximum speed $S_{max}$ of the machine 100 from 35 km/h to 8 km/h until the longitudinal plane CC' of the upper frame 104 reaches the first predetermined value V1 of 65 degrees with respect to the longitudinal plane BB' of the lower frame 106 after which the controller 204 generates signals to limit the maximum speed $S_{max}$ of the machine 100 to 8 km/h.

It may be noted that the controller 204 can be suitably coupled to numerous components of the machine 100 such as, but not limited to, the engine, a brake system, or a governor (if present) on the machine 100 for modulating an operation of such components so that the maximum speed $S_{max}$ of the machine 100 can be advantageously reduced or limited in accordance with embodiments disclosed herein while the upper frame 104 is being rotated about the lower frame 106 in reference to the second and first predetermined value V1s respectively.

Further, it is contemplated that the rotation angle $\alpha$ of the upper frame 104 relative to the lower frame 106 as detected by the sensor 202 may also be provided by the controller 204 to the memory 210 so that when the machine 100 is switched "OFF" and turned back "ON" to an operative state, the controller 204 can access the last known rotation angle $\alpha$ of the upper frame 104 relative to the lower frame 106 that is stored at the memory 210 and control the maximum speed $S_{max}$ of the machine 100 based on such stored rotation angle $\alpha$. It is also contemplated that the controller 204 could beneficially update the memory 210 with the latest detected rotation angle $\alpha$ each time the angular position of the upper frame 104 relative to the lower frame 106 changes, or alternatively at pre-determined intervals of time, suitable values of which would be apparent based on the angular velocity of the upper frame 104.

Moreover, as shown in FIG. 2, the control system 200 may also include a speed limit indicator 212 communicably coupled to the controller 204. Based on the current angular position of the upper frame 104 updated by the controller 204 at the memory 210, the controller 204 may also generate signals that control the speed limit indicator 212 to indicate whether the speed $S_{max}$ of the machine is being limited by the controller 204. The speed limit indicator 212 may be embodied in the form of any known indication device including, but not limited to, a light device such as an LED, a graphical user interface (GUI), or a sound emitting device such as a loudspeaker or piezoelectric device configured to indicate to an operator whether the speed limitation is in effect.

Figure 8:
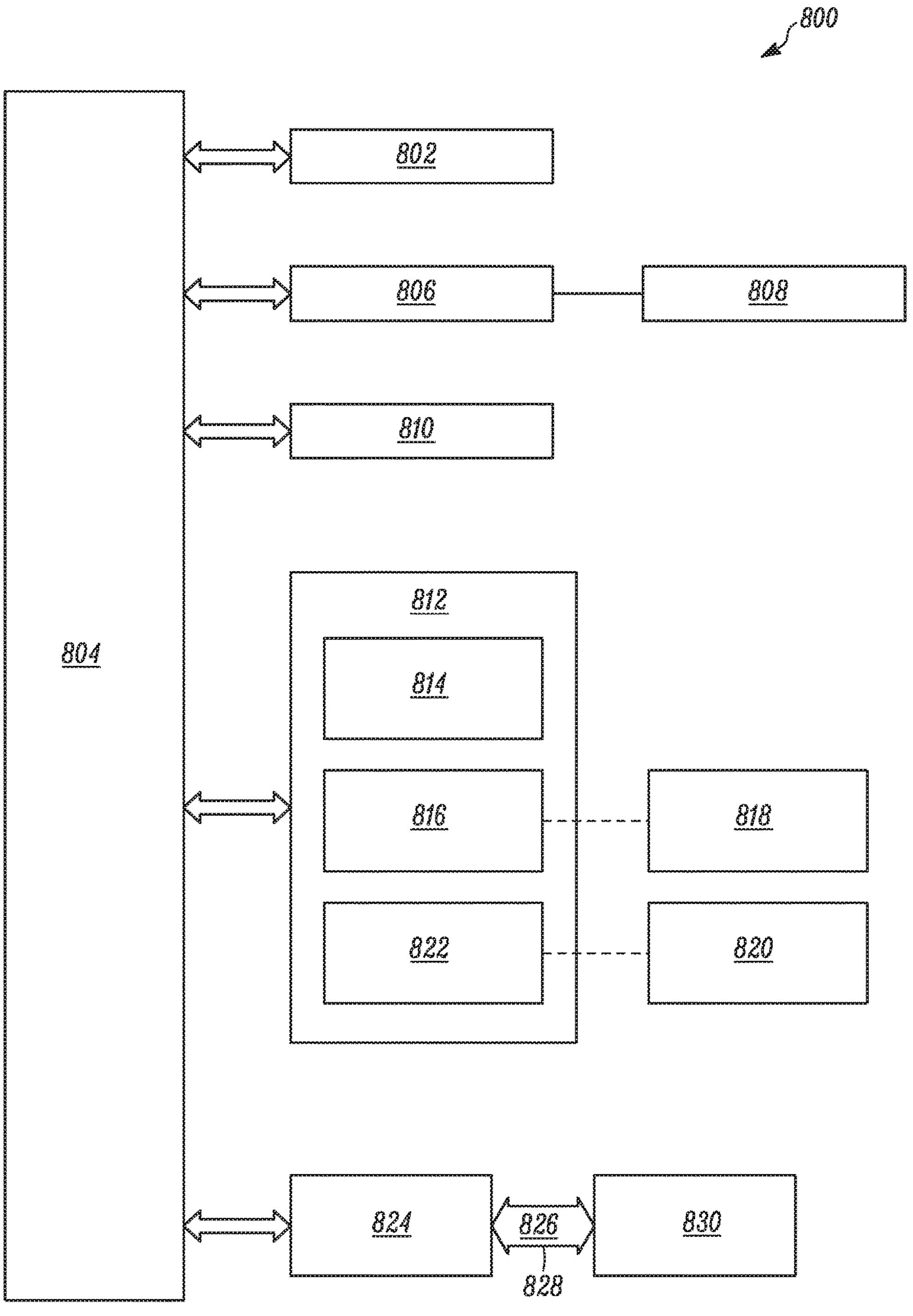
FIG. 8 is a low-level implementation of the control system, in accordance with an embodiment of the present disclosure.

FIG. 8 is an exemplary low-level implementation of the control system 200 from FIG. 2 for controlling operation of the exemplary machine 100 of FIG. 1 in accordance with embodiments of the present disclosure. For the sake of simplicity in this document, the low-level implementation of the control system 200 will hereinafter be referred to as 'a computer system' and designated with similar reference numerals to those win FIG. 2 increased by 600 i.e., reference numeral '800').

The present disclosure has been described herein in terms of functional block components, modules, and various processing steps. It should be appreciated that such functional blocks may be realized by any number of hardware and/or software components configured to perform the specified functions. For example, the controller 204 of the control system 200 may employ various integrated circuit components, e.g., memory elements, processing elements, logic elements and the like which may carry out a variety of functions under the control of one or more microprocessors or other control devices. Similarly, the software elements of the system 800 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the system 800 may employ any number of conventional techniques for data transmission, signaling, data processing, network control, and/or the like. Still further, the system 800 could be configured to detect or prevent security issues with a user-side scripting language, such as JavaScript, VBScript or the like. In an embodiment of the present disclosure, the networking architecture between components of the system 800 may be implemented by way of a client-server architecture. In an additional embodiment of this disclosure, the client-server architecture may be built on a customizable .Net (dot-Net) platform. However, it may be apparent to a person ordinarily skilled in the art that various other software frameworks may be utilized to build the client-server architecture between components of the control system 200 without departing from the spirit and scope of the disclosure.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce instructions which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

The present disclosure (i.e., control system 200, method 900, any part(s) or function(s) thereof) may be implemented using hardware, software or a combination thereof, and may be implemented in one or more computer systems or other processing systems. However, the manipulations performed by the present disclosure were often referred to in terms such as detecting, determining, and the like, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices. As such, the functions of the controller 204 can also be applied for execution in the machine 100 regardless of the machine's level of automation, such levels of automation including, but not limited to, an operator assisted mode, a remotely operated mode, a supervised mode, or a fully autonomous mode.

In accordance with an embodiment of the present disclosure, the present disclosure is directed towards one or more computer systems capable of carrying out the functionality described herein. An example of the computer based system includes the computer system 800, which is shown by way of a block diagram in FIG. 8.

The computer system 800 includes at least one processor, such as a processor 802. The processor 802 may be connected to a communication infrastructure 804, for example, a communications bus, a cross-over bar, a network, and the like. Various software embodiments are described in terms of this exemplary computer system 800. Upon perusal of the present description, it will become apparent to a person skilled in the relevant art(s) how to implement the present disclosure using other computer systems and/or architectures.

The computer system 800 includes a display interface 806 that forwards graphics, text, and other data from the communication infrastructure 804 for display on a display unit 808. In an embodiment, the display interface 806 and/or the display unit 808 could be beneficially embodied in the form of a Graphical User Interface (GUI) or other equivalent devices capable of receiving user commands. Such display interface and/or unit 806, 808 could also be located at a remote operator station (not shown) for displaying to a remotely located operator the type of control being currently implemented on the maximum speed $S_{max}$ of the machine 100 and hence, also on the travel speed of the machine 100 based on the detected rotation angle $\alpha$ of the upper frame 104 relative to the lower frame 106.

The computer system 800 further includes a main memory 810, such as random access memory (RAM), and may also include a secondary memory 812. The secondary memory 812 may further include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a well-known manner. The removable storage unit 818 may represent a floppy disk, magnetic tape or an optical disk, and may be read by and written to by the removable storage drive 816. As will be appreciated, the removable storage unit 818 includes a computer usable storage medium having stored therein, computer software and/or data.

In accordance with various embodiments of the present disclosure, the secondary memory 812 may include other similar devices for allowing computer programs or other instructions to be loaded into the computer system 800. Such devices may include, for example, a removable storage unit 820, and an interface 822. Examples of such may include a program cartridge and cartridge interface (such as that found in video game devices), a removable memory chip (such as an erasable programmable read only memory (EPROM), or programmable read only memory (PROM)) and associated socket, and other removable storage units 820 and interfaces 822, which allow software and data to be transferred from the removable storage unit 820 to the computer system 800.

The computer system 800 may further include a communication interface 824. The communication interface 824 allows software and data to be transferred between the computer system 800 and the external devices 880. Examples of the communication interface 824 include, but may not be limited to a modem, a network interface (such as an Ethernet card), a communications port, a Personal Computer Memory Card International Association (PCMCIA) slot and card, and the like. Software and data transferred via the communication interface 824 may be in the form of a plurality of signals, hereinafter referred to as signals 826, which may be electronic, electromagnetic, optical or other signals capable of being received by the communication interface 824. The signals 826 may be provided to the communication interface 824 via a communication path (e.g., channel) 828. The communication path 828 carries the signals 826 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 816, a hard disk installed in the hard disk drive 814, the signals 826, and the like. These computer program products provide software to the computer system 800. The present disclosure is also directed to such computer program products.

Computer programs (also referred to as computer control logic) may be stored in the main memory 810 and/or the secondary memory 812. Computer programs may also be received via the communication interface 804. Such computer programs, when executed, enable the computer system 800 to perform the functions consistent with the present disclosure, as discussed herein. In particular, the computer programs, when executed, enable the processor 802 to perform the features of the present disclosure. Accordingly, such computer programs may represent controllers of the computer system 800.

In accordance with an embodiment of the present disclosure, where the disclosure is implemented using a software, the software may be stored in a computer program product and loaded into the computer system 800 using the removable storage drive 816, the hard disk drive 814 or the communication interface 824. The control logic (software), when executed by the processor 802, causes the processor 802 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

Figure 9:
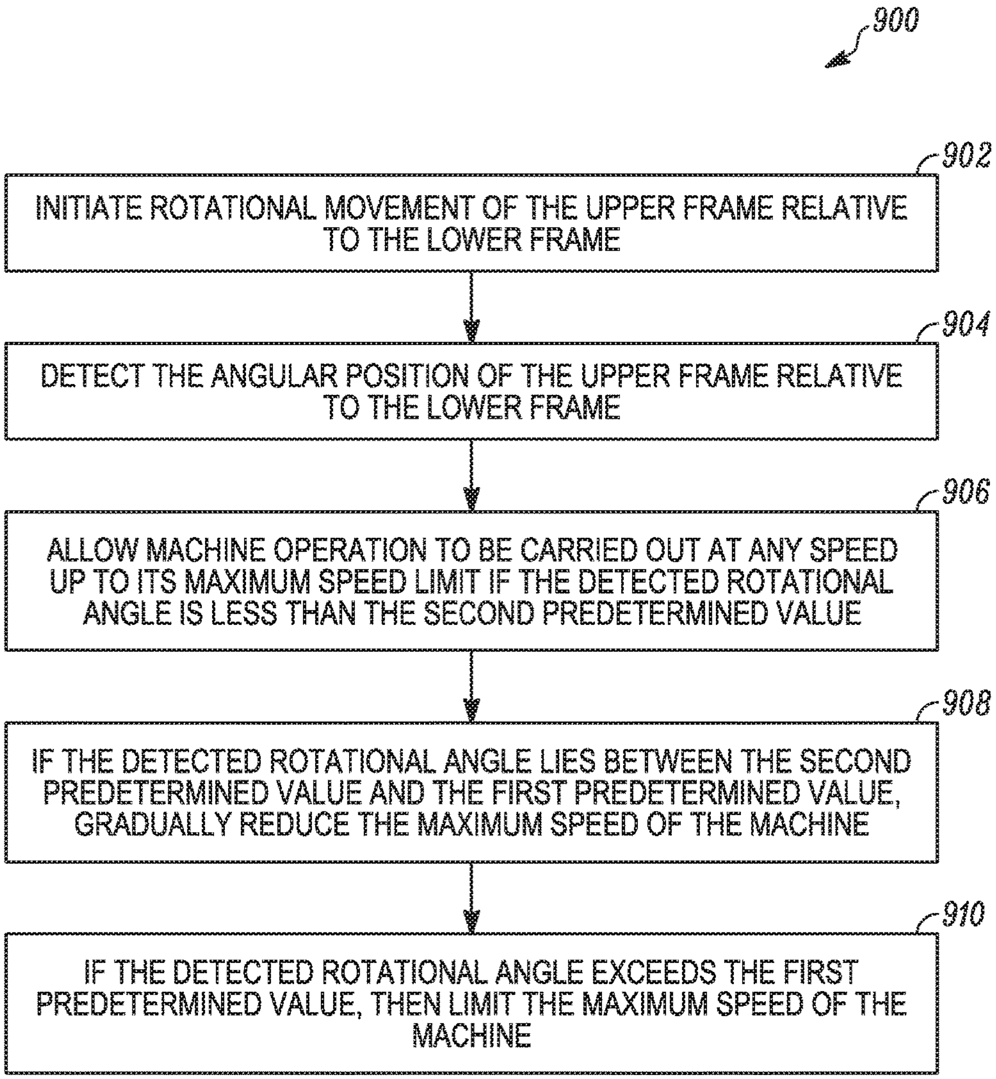
FIG. 9 is a flowchart depicting a method for controlling operation of the exemplary machine of FIG. 1, according to an embodiment of the present disclosure.

FIG. 9 illustrates a method 900 of operation of the control system 200. At step 902, a rotational movement of the upper frame 104 about the lower frame 106 is initiated i.e., movement of the upper frame 104 is initiated about the swivel axis AA'. At step 904, the sensor 202 detects the angular position of the upper frame 104 relative to the lower frame 106. If the rotation angle $\alpha$ of the upper frame 104 relative to the lower frame 106 detected by the sensor 202 is less than the second predetermined value V2, then the controller 204, at step 906, allows operation of the machine 100 to be carried out at any speed up to its rated maximum allowable speed e.g., at the maximum speed $S_{max}$ of 35 km/h as shown in FIGS. 4-7.

If the rotation angle $\alpha$ detected by the sensor 202 lies between the second predetermined value V2 and the first predetermined value V1, then at step 908, the controller 204 generate signals to gradually reduce the maximum speed $S_{max}$ of the machine 100. A rate of deceleration or retardation of the machine 100 could be selected depending on specific requirements of an application, for example, based on a type of machine used, a rapidity with which operations in the machine may be carried out and the like.

If the rotation angle $\alpha$ of the upper frame 104 relative to the lower frame 106 detected by the sensor 202 exceeds the first predetermined value V1, then the controller 204, at step 910, generate signals to limit the maximum speed $S_{max}$ of the machine 100, for example, from 35 km/h to 8 km/h as shown by way of example in each of the FIGS. 4-7.

The present disclosure provides the system 200 and the method 900 by which the maximum speed $S_{max}$ and hence, the travel speed of the machine 100 may be controlled based on a movement of the upper frame 104 relative to the lower frame 106 of the machine 100. By gradually reducing travel speed of the machine 100 before limiting the maximum speed $S_{max}$ of the machine 100, changes in the speed of movement associated with the machine 100 may be made smoothly. It is envisioned that reducing or limiting the maximum speed $S_{max}$ of the machine 100 while the upper frame 104 is rotated about the lower frame 106 also aids the operator in providing better control over the movement of the machine 100.

Various embodiments disclosed herein are to be taken in the illustrative and explanatory sense, and should in no way be construed as limiting of the present disclosure. All numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure is applicable for use in work machines, such as wheeled excavators, in which an upper frame is rotatably mounted to a lower frame. The control system and method of the present disclosure may improve operator control of the machine when the machine is operated with the upper frame is rotated relative to the lower frame.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A control system for a work machine having an upper frame rotatably mounted to a lower frame, comprising:

a sensor configured to detect the rotation angle between the upper frame and the lower frame, and a controller configured to limit a maximum travel speed of the work machine when the detected rotation angle between the upper frame and the lower frame exceeds a first predetermined value.

2. The control system of claim 1, wherein:

the controller is configured to reduce the maximum travel speed of the work machine when the detected rotation angle is between the first predetermined value and a second predetermined value according to the rotation angle.

3. The control system of claim 2, wherein:

at least one of the first and second predetermined values is in the range of 70-110 degrees.

4. The control system of claim 1, further comprising:

a speed limit indicator, wherein the controller is configured to control said speed limit indicator to indicate whether the maximum travel speed is limited.

5. The control system of claim 1, wherein:

the controller is configured to limit the maximum travel speed of the work machine to less than 10 kilometers per hour.

6. A work machine, comprising:

an upper frame rotatably mounted to a lower frame;

a sensor configured to detect the rotation angle between the upper frame and the lower frame, and a controller configured to limit a maximum travel speed of the work machine when a rotation angle between the upper frame and the lower frame exceeds a first predetermined value.

7. The work machine of claim 6, wherein:

the first predetermined value is in the range of 70-110 degrees.

8. A method for controlling a work machine having an upper frame rotatably mounted to a lower frame, the method comprising:

detecting a rotation angle between the upper frame and the lower frame, and limiting a maximum travel speed of the work machine when the detected rotation angle between the upper frame and the lower frame exceeds a first predetermined value.

9. The method of claim 8, further comprising:

reducing the maximum speed of the work machine according to the detected rotation angle when the rotation angle is between the first predetermined value and a second predetermined value.

10. The method of claim 9, wherein:

at least one of the first and second predetermined values is in the range of 70-110 degrees.

11. A non-transitory computer readable medium containing program instructions for causing a computer to control a work machine having an upper frame rotatably mounted to a lower frame, the program instructions comprising:

limiting a maximum speed of the work machine when a rotation angle between the upper frame and the lower frame exceeds a first predetermined value.

* * * * *